United States Patent Office 3,530,949
Patented Sept. 29, 1970

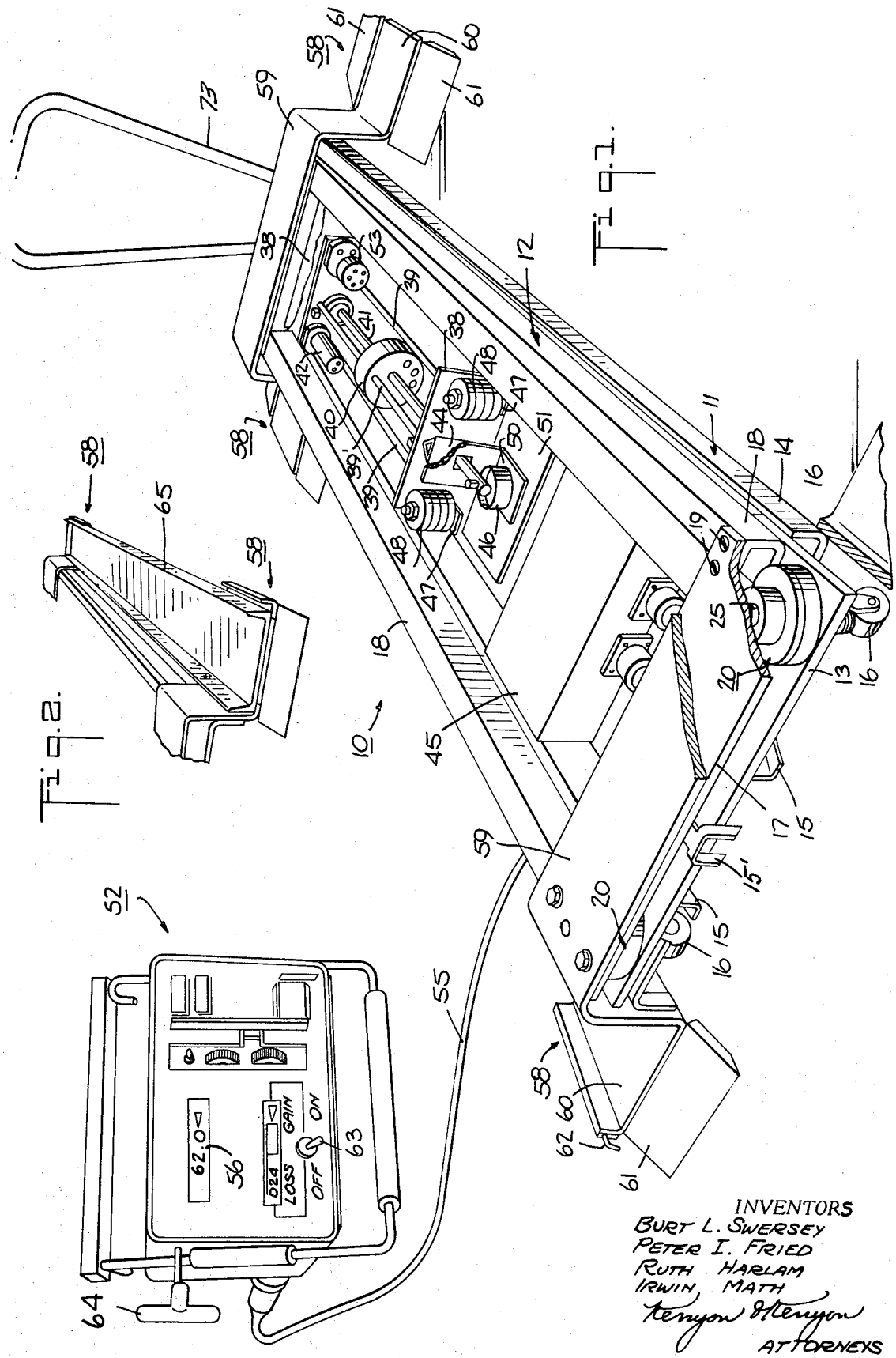

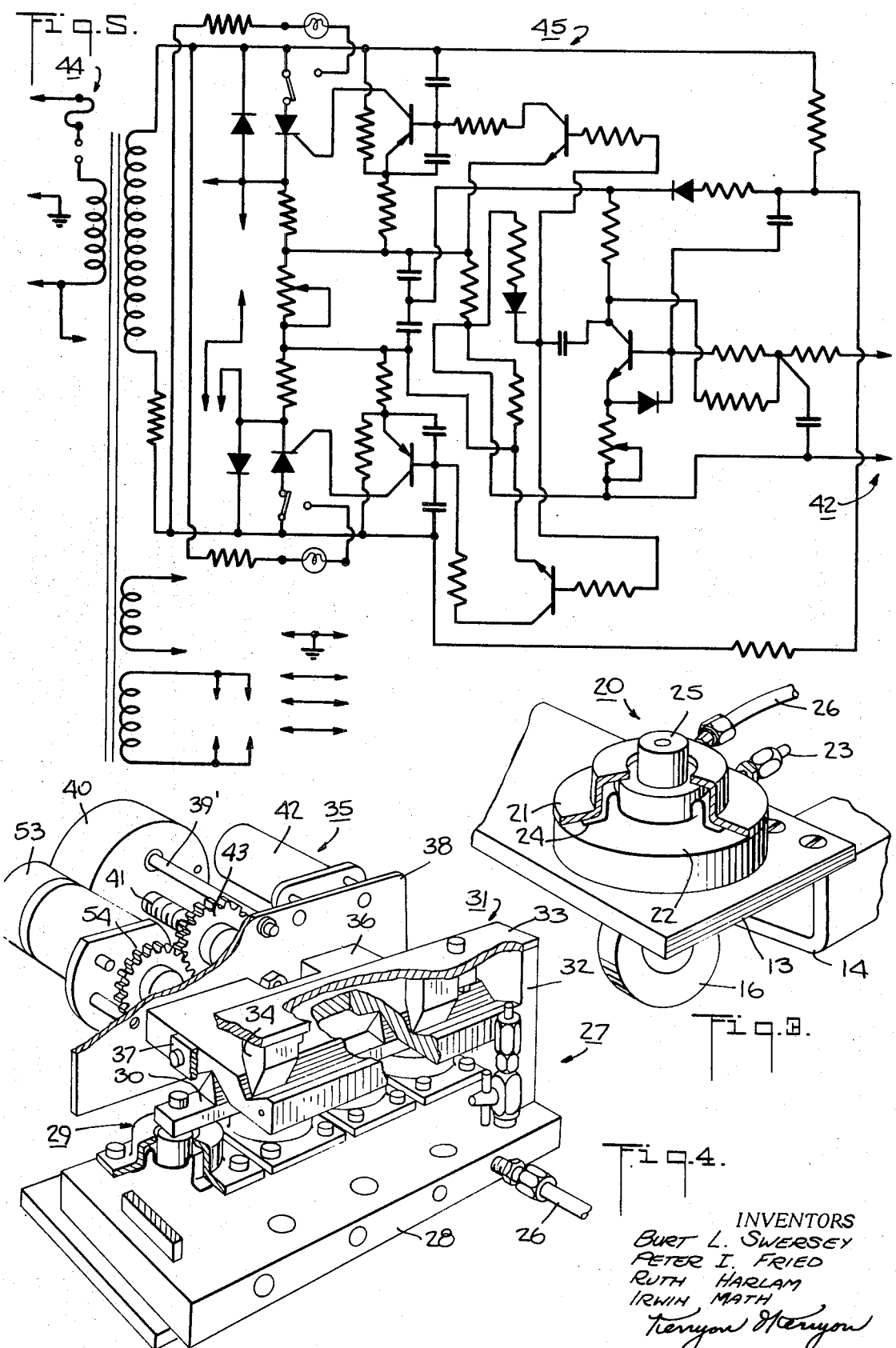

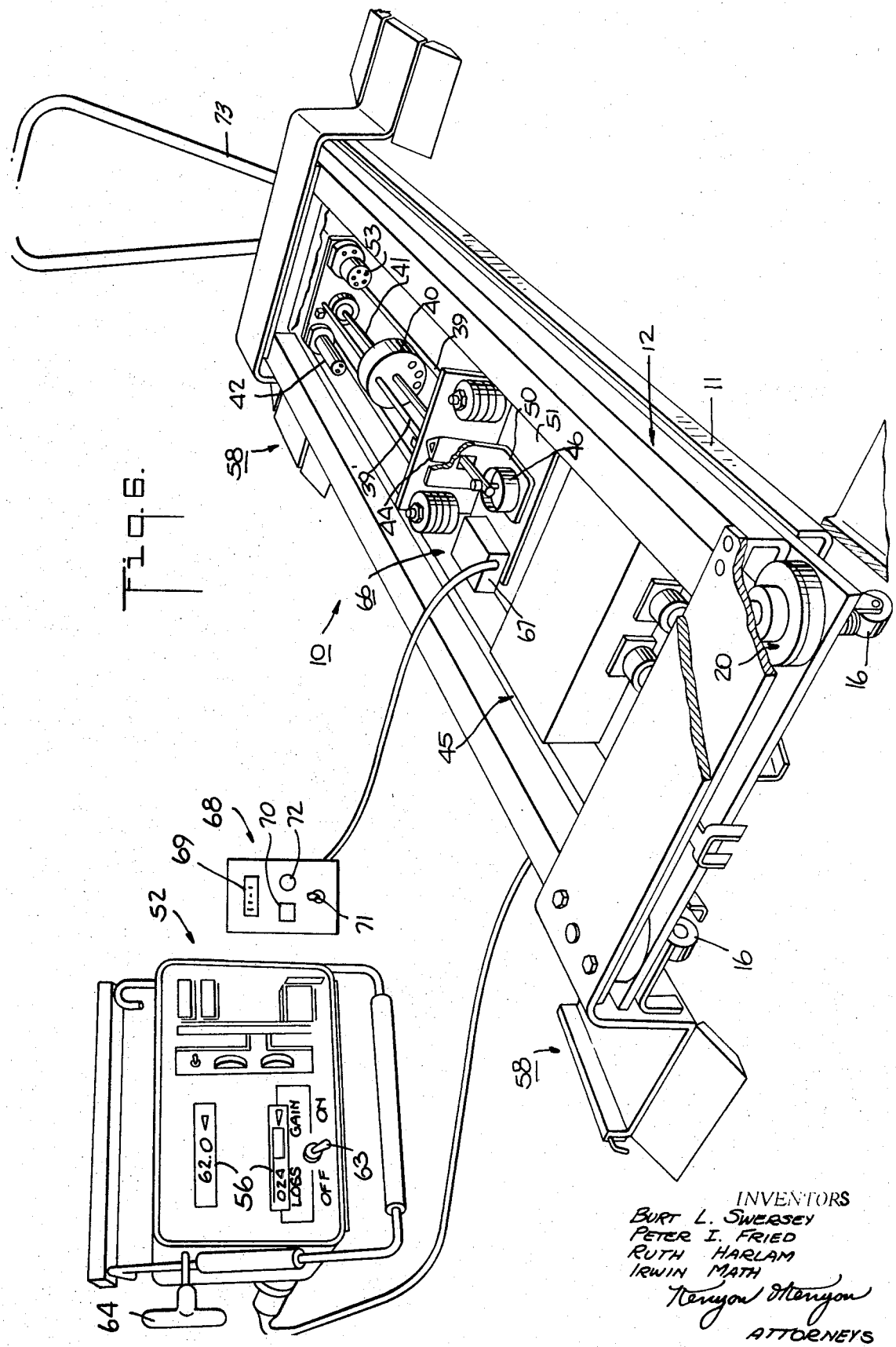

3,530,949
HYDRAULIC WEIGHT TOTALIZING APPARATUS WITH ELECTRIC RE-BALANCING
Burt L. Swersey and Peter I. Fried, Hartsdale, Ruth Harlam, New York, and Irwin Math, Beechhurst, N.Y., assignors to Brookline Instrument Company, White Plains, N.Y., a corporation of New York
Filed Apr. 14, 1969, Ser. No. 815,722
Int. Cl. G01g 5/04, 7/00
U.S. Cl. 177—209         12 Claims

ABSTRACT OF THE DISCLOSURE

The scale accurately senses the weight of a load and also continuously senses variations in the load weight. The counterweight assembly is mounted within the confines of the scale and the scale is trasportable from place to place. The scale can be provided with ramps upon which a hospital bed can be mounted for weighing.

This invention relates to a scale. More particularly, this invention relates to a scale for determining variations of weight.

Heretofore, it has been known to utilize various types of scales for weighing persons or objects such as a medical patient. For example, in some cases, movable scales have been known wherein a bed-ridden patient can be weighed by bringing the scale to the bedside and by lifting not only the patient but also the bed in which the patient is confined on a weighing platform. Other scales have also been known, for example, as in U.S. Pat. 3,338,-323, wherein a bed in which a patient is confined is mounted directly upon the scale mechanism in a stationary manner.

However, these heretofore known scales have been either too cumbersome to use in weighing a patient or have been of relatively expensive construction. For example, in the case of the first type of scale, it is necessary to transport the scale to the bed in which the patient is confined and to manipulate through various mechanisms a weighing platform so as to first position the platform under the bed and then to lift the bed so as to weigh the patient in bed. Furthermore, these types of scales have only been utilized to register the weight of the patient and have not been capable of indicating variations in weight of a patient over a peroid of time. The second type of scales, while being capable of indicating weight variations in a patient, have been constructed in a relatively expensive manner.

Further, scales have been known for weighing a bed-ridden patient and for indicating subsequent changes in weight in the patient. However, these scales have not been capable of automatic controls for continuously monitoring the patient's weight nor have such scales been provided with a convenient means for visually recording the changes in weight.

Accordingly, it is an object of the invention to provide a scale which is of relatively low-cost construction.

It is another object of the invention to provide a scale which is capable of measuring variations in weight of a load.

It is another object of the invention to record the variations in weight of a load over a period of time.

It is another object of the invention to provide a scale on which a bed can be readily mounted and removed.

Briefly, the invention provides a scale which is constructed with a support frame and a weighing platform upon which a load, such as a bed, can be mounted. In addition, the scale includes a totalizer assembly mounted within the confines of the support frame which functions to indicate the weight of the load, such as a bed-ridden patient, as well as to indicate variations in the weight of the load over a period of time. Further, the invention provides a read-out console which is connected to the totalizer assembly of the scale so that the weight of a load and variations in the weight of the load can be visually presented.

The support frame is constructed of a rectangular configuration and includes means, such as a hydraulic load cell, at each corner for supporting the weighing platform. Such load cells can be constructed with pistons which are vertically movable and which mount the weighing platform thereon so that movement of the weighing platform with respect to a weight effects the movement of the piston. Each of the load cells is further connected by a hydraulic system to the totalizer assembly mounted on the support frame.

The totalizer assembly includes a support plate which is fixed to the support frame and which mounts a fixed knife edge support thereon. In addition, the totalizer assembly includes a counterweight assembly which is pivotally mounted on the fixed knife edge support so as to pivot about the fixed knife edge support. Also, the totalizer assembly includes a plurality of hydraulic cells similar to the load cells on the support frame which are hydraulically connected to the respective load cells so as to react to the changes in load on the load cells. The cells of the totalizer assembly are aligned with each other so as to transmit a variation in loading to a knife edge spaced from the fixed knife edge portion. The knife edge applies the transmitted load and load variations to the counterweight assembly so as to pivot the counterweight assembly about the fixed knife edge support.

In addition, the counterweight assembly includes a movable weight which is disposed to slide along a guide rod so as to balance the load transmitted through the knife edge of the hydraulic cells. The free of the counterweight assembly also is provided with a means which senses the position of the counterweight assembly with respect to a level horizontal plane and which produces a signal in response to a deviation from this horizontal plane which is used to move the weight along the guide rod. This means is electrically connected to a drive motor in the counterweight assembly which drives, for example, a plurality of gears to rotate a threaded lead screw which threadably extends through the weight. In this manner, depending upon the direction of movement of the counterweight assembly, the drive motor is actuated to rotate the lead screw and thereby move the weight along the guide rod. The counterweight assembly is further provided with a plurality of tare weight platforms at the free end so that various tare weights can be mounted thereon to initially balance out an initial load such as the weight of a bed. After a load such as a patient is placed on the bed and is initially weighed, the weight can then be used to compensate for any variations in load or weight of the patient.

The weighing platform is of substantially rectangular configuration and can be provided with suitable ramps at the respective ends for receiving a bed thereon. For example, in one embodiment, the weighing platform is provided with a ramp at each corner in dependent fashion so that a bed can be rolled longitudinally up onto the ramps. In another embodiment, the ramps can be provided with a runner which extends longitudinally along the bed so that the weighing platform can accommodate various sizes of beds. In another embodiment, the ramps can be provided at the two ends of the weighing platform so that a bed can be rolled onto the platform sideways. In each case, the platform is provided with a pivotally mounted plate which functions initially to permit the bed to be rolled up on the platform and which thereafter can be pivoted into an upward position so as to prevent the bed from rolling off the platform. When in the upward position, the pivotal plate can be locked in position by a suitable locking means.

The read-out console is electrically connected to the counterweight assembly via a pair suitable position transmitting motors one of which is connected to the gears which are driven by the drive motor and the other of which matches the first. In this way, the motion which is imparted to the movable weight can simultaneously be imparted to the read-out assembly so that the weight of a load can be indicated on a suitable read-out dial thereon. Further, the read-out console can be provided with a weight change indicator which is calibrated, for instance, in grams and suitably connected to the position transmitting motor on the scale. Such a weight change indicator can initially be set to a zero reading at the initial weight of the patient on the scale by means such as an electric clutch and thereafter, any fluctuation in weight of the load can be directly recorded on the weight change indicator to be seen visually. The read-out console can also be provided with various auxiliary components so as to indicate when a weight has exceeded a heavy value or has been reduced to a light value. Also, an accessory such as a printer can be provided in the read-out console which will permit a constant recording of the weight of a variable load with respect to time on a suitable time chart.

In addition, auxiliary read-out consoles can be connected to the counterweight assembly in suitable manners and located at a remote central control area. In this way, the remote read-out console can be positioned adjacent other read-out consoles so that a number of loads can be simultaneously controlled by a single operator while the local read-out consoles adjacent the respective scales are available for use by an operator on an individual basis.

In addition, in another embodiment, the scale can be incorporated into various systems such as automatic batching systems wherein one or more components are to be batched, for example, for subsequent packaging. In such instances, the scale can be provided with a means connected to the counterweight assembly to control the feeding of a batched component into a hopper located on the weighing platform of the scale. For example, with the component material being poured into the hopper through a valve, the means can be controlled by the position of the movable weight on the counterweight assembly so as to shut off the valve upon the movable weight reaching a predetermined point. Alternatively, the valve could be controlled in a manner such that the rate of feeding of the batching component is slowed after the movable weight has reached a point corresponding to, for example, 90% of the desired total weight.

In addition, the scale of the invention can be used in various systems where it is necessary to regulate or maintain a load at a predetermined variable weight. For example, in the case of a patient undergoing a dialysis treatment wherein it is necessary to regulate the flow of fluid into and from the patient, the scale of the invention can be provided with a rate monitor system. Such a rate monitor system can be connected to the drive motor of the movable weight in the counterweight assembly and can be provided with a rate regulating means which is adjustable to a predetermined rate of weight gain or loss. In use, with the predetermined rate of weight gain or loss being set, the rate monitor assembly can regulate the drive motor so as to move the movable weight along the guide rod in a uniform manner. Should the patient lose weight in accordance with this regulated decrease, the rate monitor system and scale will function in a normal fashion. However, should the patient be losing a greater amount of weight then the regulated weight, then the read-out console can be used to indicate a signal which corresponds to too great a decrease in weight. Upon release of such a signal, the rate of withdrawal of the fluid from the patient can be decreased or the condition causing the greater weight of weight loss in the patient can be otherwise corrected. On the other hand, if the patient's weight does not decrease as fast as the regulated rate of decrease, then the read-out console can be provided with a signal which indicates such. In this event, the rate of withdrawal of fluid from the patient can be increased. This use of the invention can be especially useful in the treatment of patients for blood transfusions or any other treatment which involves the removing or adding of weighted materials to a patient's body.

The scale can also be provided with handles at the ends which function to permit transportation of the scale in an easy manner. Furthermore, the read-out console can be provided with a suitable handle or hook so as to be disposed on the handle of the scale during transport.

These and other objects and advantages of the invention will become more apparent from the following detailed description and appended claims taken in conjunction with the accompanying drawings in which:

FIG. 1 illustrates a perspective view of a scale according to the invention;

FIG. 2 illustrates a fragmentary perspective view of a scale according to the invention utilizing a runner between the ramps at the end of the scale;

FIG. 3 illustrates a fragmentary cross-sectional view of a load cell at a corner of the scale;

FIG. 4 illustrates a perspective view of the counterweight assembly of the scale of FIG. 1;

FIG. 5 schematically illustrates a circuit of the counterweight assembly of the invention; and FIG. 6 illustrates a perspective view of the scale of FIG. 1 utilized with a rate monitor system.

Referring to FIG. 1, the scale 10 includes a support frame 11 and a weighing platform 12 mounted above the support frame 11 and is constructed in a rectangular configuration of open construction. For example, the support frame 11 has a pair of end plates 13 and a pair of side rails 14 which extend between the end plates 13. The side rails 14 are of hollow box shape construction and the support frame can be further provided with supports 15 and a yoke 15' for removably receiving a handle 73. In order to provide for mobility, the support frame is mounted on wheels or casters 16 at the corners. In addition, the support frame where necessary can be provided with levelling screws (not shown) so that the support frame 11 can be leveled into a horizontal plane for use.

The weighing platform 12 is constructed of a similar rectangular configuration of open shape and is provided with a pair of end plates 17, and a pair of side rails 18 connected to the end plates 17, for example, by threaded members 19. As shown, the side rails can be of hollow box shape cross section.

Referring to FIGS. 1 and 3, a hydraulic means is used to mount the weighing platform 12 on the support frame 11. This hydraulic means includes a load cell 20 mounted at each corner of the support frame 11. Each load cell 20 includes a housing 21 which encloses a reservoir of fluid 22 which is supplied thereto through a suitable line 23 as well as a flexible diaphragm 24 which extends across the reservoir as is known. In addition, a piston 25 is mounted on the diaphragm 24 in spaced relation to the side walls of the housing 21. This piston 25 is mounted on the diaphragm 24 so as to be automatically centered in the housing in a freely guided manner as is known. The load cell 20 further communicates with an outlet line 26 so that the force imposed upon the piston 25 from the weighing platform 12 can be transmitted to a totalizer assembly 27 mounted at one end of the support frame 11.

Referring to FIG. 4, the totalizer assembly 27 includes a support plate 28 which is mounted on an end plate 13 of the support frame. The support plate 28 mounts a plurality of load cells 29 thereon, each of which communicates with a load cell 20 on the support frame 11 via the outlet lines 26 and communicating bores through the support plate 28. Each load cell 29 is constructed in similar fashion to the load cell 20 on the support frame and need not be further described. The load cells 29 are aligned with each other and mount a common knife edge 30 thereon. The support plate 28 further mounts a fixed knife edge support 31 which includes a pair of uprights 32, a horizontal plate 33, and a pair of knife edges 34 mounted on a common support which depend from plate 33. The counterweight assembly 35 includes a bearing block 36 which is mounted under the fixed knife edge supports 34 and over the knife edges 30 of the load cells 29. This block 36 is centered on the knife edges 30 by suitable retaining plates 37 at the sides of the block 36. In addition, the counterweight assembly 35 includes a pair of vertically disposed mounting plates 38 which are secured together by a plurality of elongated rods 39 and which are secured to the block 36 in a cantilevered fashion. The uppermost rod 39′ serves as a guide rod for a movable weight 40 slidably mounted thereon. A threaded lead screw 41 is threadably mounted in the movable weight 40 and is rotatably mounted at the ends in the respective mounting plates 38.

In order to rotate the lead screw 41, a drive motor 42 is mounted on the mounting plate 38 nearest the block 36 and engages via a suitable gear (not shown) with a gear 43 fixedly mounted on the lead screw 41. Upon actuation of the motor 42, the gears are caused to rotate and thus the lead screw 41 rotates. This permits the lead screw to drive the movable weight 40 along the guide rod 39.

Referring to FIG. 1, the counterweight assembly further includes a sensing means 44 at the free end for determining the balance of the counterweight assembly. The sensing means 44 includes a differential transformer which is electrically connected via a servo-amplifier 45 (FIG. 5) of known construction to the drive motor 42. In addition, the sensing means may include a damping pot 46 which serves to damp out fluctuations in the sensing means due to oscillations of the counterweight assembly 35. However, this damping pot can be eliminated where the damping qualities of the hydraulic system are adequate.

In addition, the free end of the counterweight assembly 35 is provided with a pair of platforms 47 on which various tare weights 48 can be mounted so as to initially balance out the initial load on the weighing platform 12. Also, a stop plate 50 is mounted at the free end of the counterweight assembly 35 on a suitable plate 51 fixed to the support frame 11. This support plate suitably carries the damping pot 46.

Referring to FIG. 1, a read-out console 52 for indicating the weight of a load on the weighing platform 12 is connected to the counterweight assembly 35, for example, electrically. To this end, a synchronized slave motor 53 is mounted on the mounting plate 38 of the counterweight assembly 35 and is connected by a gear 54 to the gear 43 of the lead screw 41 and via an electric cable 55 to a similar slave motor (not shown) in the console 52. In this manner, the motor 53 is driven in a fixed ratio with the lead screw 41 so that the change in weight of a load on the weighing platform 12 can be imparted not only to the movable weight 40 but also to the slave motor (not shown) in the read-out console 52 simultaneously. A second slave motor in the console 52 is further connected to the motor 53 via line 55 and both motors in the console 52 are connected to separate read-out dials 56, 56′ via electric clutches on the shafts of the motors. In this way, one motor is used to drive one dial 56 to indicate actual weights while the other motor is used to drive the other dial 56′, for example, of a double shutter counter, to indicate changes in weight.

The weighing platform 12 is further provided with ramps 58 upon which loads such as hospital beds can be mounted. These ramps include, for example, a plate 59 secured across the end plates of the weighing platform 12 and a pair of depending platforms 60 which depend from the plate 59. In addition, each platform 60 includes a pair of stop plates 61 which are pivotally mounted on the platform 60 and a locking means such as a rotatable pin 62 for locking the stop plates in an upright vertical position.

In order to use the scale 10, an electronic circuitry is initially shut off and a load, such as a bed, is rolled up on the ramps 58. The stop plates 61 are then pivoted into an upright vertical position to lock the bed in place. Next, the circuit of the scale 10 is actuated, for example, from an on-off switch 63 on the read-out console 52 which actuates the clutches of the console motors (not shown). At this point, the tare weights 48 can be placed on the platforms 47 so as to balance the counterweight assembly 35 with the movable weight located near the block end of the lead screw 41 and the dial 56 is set to zero. Next, a patient is placed on the bed and the movable weight 40 moves out to balance the weight of the patient. The patient's weight can then be read directly from the dial 56. The scale 10 thereafter will continuously record any variation in the weight of the patient. For example, should the bed-ridden patient lose weight through transpiration or otherwise, the scale will automatically reflect this weight loss. That is, as the patient loses weight, the force transmitted via the load cells 20, 29 to the block 36 decreases so that the counterweight assembly 35 pivots downwardly. This causes the differential transformer 44 to detect the out-of-balance and to direct a signal to the drive motor 42 via the servo-amplifier 45. The drive motor 42 then drives the gear 43 and the lead screw 41 causing the rotation of the lead screw 41. This moves the movable weight 40 along the guide rod 39′ in a direction to bring the counterweight assembly 35 back into balance. At the same time, the motor 53 is driven by the gear 54 so as to actuate the matching slave motor and the dial counter 56 so as to indicate the decrease in weight in the patient. To this end, the dial counter 56 can be calibrated in grams.

Should the load on the weighing platform 12 increase, the scale 10 will react in the opposite fashion so as to indicate the increase in weight.

Should an additional weight be added to the weighing platform, for example, a pillow for a patient, the read-out 52 can be shut off before the weight is added. After the weight has been added, the scale can then be automatically rebalanced as above. Thereafter, read-out console 52 can be switched on. Alternatively, the dial on the console 52 can be reset by use of the knurled knob 64 on the console 52 to compensate for added weights.

Referring to FIG. 2, in order to facilitate mounting of loads, such as beds, on weighing platform 12, a channel shaped runner 65 can be mounted between a pair of ramps 58 on each side of the scale 10. In this way, beds of different lengths can be mounted on the weighing platform 12. Alternatively, the ramps and runners can be disposed on the other sides of the scale so that a bed can be rolled onto the ramps sideways.

Referring to FIG. 5, wherein like reference characters have been used to indicate like parts as described above, the scale 10 can be utilized with a rate monitor system 66 so that a changing load that changes with time on the weighing platform of the scale can be regulated. To this end, the transformer of the sensing means 44 is connected to a rate monitor 67 on the scale 10 which in turn is connected to the drive motor 42, e.g., electrically. In addition, the rate monitor connected to a remote console 68 via an electrical cable which includes a meter 69, a digital dial 70, an on-off switch 71 and an alarm 72. The meter 69 serves to permit a predetermined rate of weight change to be set so that the rate monitor 67 drives the lead screw 41 at a programmed rate to monitor the actual change in the load on the scale. The dial 70 is connected to the meter to register the rate of change selected while the switch 71 serves to deactivate or activate the system 66. The alarm 72 can be connected to the system 66 so as to be activated should the actual rate of weight change exceed or lag behind the monitored rate by a predetermined amount.

This latter structure is especially useful in treating patients for dialysis, blood transfusions, etc., wherein it is necessary to determine whether or not a patient is gaining or losing weight at a predetermined rate. Also, the structure is useful in commercial usage for batching components of a mixture together.

Referring to FIG. 1, in order to move the scale 10 from place to place, a handle 68 is removably attached at either end. In addition, the read-out console 52 can be provided with a hook shaped handle to hang over the handle 73 so as to be transported along with the scale 10.

The invention thus provides a scale which can be used to accurately determine changes in weight of a load. Furthermore, it is noted that the scale is sensitive to changes in weight, for example, to accurately measuring changes of 25 grams.

The invention further provides a scale which continuously measures a load on a weighing platform in a manner such that any changes in the weight of the load are automatically sensed and recorded. In this regard, it is noted that the read-out console of the invention can be provided with various accessories so as to continuously print out a graph of weight with respect to time or to print out the actual weight at given time intervals. In addition, the read-out console can be provided with means to indicate when a load which is undergoing a controlled change in weight exceeds or falls under the determined rate of change. To this end, the read-out console can be provided with indicator lights which would represent the two extremes. Furthermore, the rear-out console can be provided with a suitable signal means to stop the movable weight or indicate when the movable weight is at either end of the guide rod. In this way, one or more of the tare loads on the counterbalance assembly can be added or removed so that the movable weight can be restored to a more central position on the guide rod. This will prevent jamming of the movable weight at the ends of the counterbalance system should there be a large change in the load on the weighing platform.

The scale of the invention can further be utilized for whighing various types of loads. For example, the scale can be used in systems which is necessary to batch various ingredients together. In such systems, the scale can be used to initiate or cutoff a flow of the various ingredients into a hopper mounted on the weighing platform of the scale at various predetermined intervals of load such that each of the ingredients is batched in the proper amount.

Further, the scale can be provided with a means for compensating for any time lag in the scale response to a change in load. For example, such means can include an electrical circuit which is connected to the differential transformer and motor 42. This circuit can incorporate a means to sense a predetermined voltage level in the transformer as the transformer approaches its null position (at which the voltage is zero) and to activate a switch to open the circuit to the motor 42 in response to the sensed voltage. Opening of the motor circuit will thus cause the motor 42 to stop. The point at which the switch is activated can be such that the motor is stopped completely or is allowed to be restarted in the same direction through a pulsing of the switch. This will prevent any override of the motor past the null position which may otherwise cause an oscillation in the scale.

What is claimed is:
1. A weighing scale comprising
   a support frame having a plurality of first hydraulic load cells thereon;
   a weighing platform mounted on said load cells;
   a totalizer assembly mounted on said support frame including a knife edge support, a counterweight assembly pivotally mounted on said knife edge support, and a hydraulic means hydraulically connected to said first load cells to transmit a load to said counterweight assembly to pivot said counterweight assembly about said knife edge support, said counterweight assembly including a movable counterweight thereon and means for moving said counterweight to balance out variations in the load transmitted to said counterweight assembly; and
   a read-out console having a weight indicator connected to said means for moving said counterweight to visually indicate the variations in load on said platform.

2. A weighing scale as set forth in claim 1 wherein said hydraulic means of said totalizer assembly includes a plurality of aligned second load cells connected respectively to said first load cells and a knife edge mounted on said second load cells in contact with said counterweight assembly.

3. A weighing scale as set forth in claim 2 wherein said second load cells and said counterweight are mounted on the same side of said knife edge support.

4. A weighing scale as set forth in claim 1 wherein said counterweight assembly includes a guide rod slidably mounting said counterweight thereon, and said means for moving said counterweight includes means at the end of said counterweight assembly for indicating the balance condition of said counterweight assembly, a threaded screw threaded through said counterweight and rotatably mounted in said counterweight assembly, and a drive motor connected to said means at the end of said counterweight assembly and said screw for responding to said means to selectively rotate said screw whereby said counterweight is selectively moved along said guide rod.

5. A weighing scale as set forth in claim 4 wherein said means on the end of said counterweight assembly is a differential transformer.

6. A weighing scale as set forth in claim 4 which further comprises a position transmitting motor connected to said drive motor and said weight indicator to respond to said drive motor whereby said weight indicator is actuated to indicate a load variation.

7. A weighing scale as set forth in claim 6 wherein said position transmitting motor is mechanically connected to said drive motor and electrically connected to said weight indicator.

8. A weighing scale as set forth in claim 1 wherein said weighing platform includes a plurality of ramps thereon for supporting a movable bed.

9. A weighing scale as set forth in claim 8 wherein each said ramp includes a base plate located near a corner of said support frame, a pair of pivotally mounted plates on said base plate and means for locking said pivotally mounted plates in an upright manner to retain a bed on said ramps.

10. A weighing scale as set forth in claim 9 which further includes a pair of removable runners, each runner extending between a pair of ramps to receive the bed thereon.

11. A weighing scale as set forth in claim 1 wherein said weighing platform includes a pair of ramps located on opposite sides thereof for mounting a movable bed on said platform.

12. A weighing scale as set forth in claim 1 which further comprises a rate monitor system connected to said means for moving said counterweight, said system including means for moving said counterweight at a predetermined rate whereby the rate of change in weight of a load on said weighing platform is monitored and controlled.

References Cited

UNITED STATES PATENTS

| | | | |
|---|---|---|---|
| 2,430,702 | 11/1947 | Bohannan | 177—209 XR |
| 2,457,655 | 12/1948 | Gifford | 177—209 XR |
| 2,667,702 | 2/1954 | Belknap. | |
| 3,338,323 | 8/1967 | Swersey | 177—209 XR |

FOREIGN PATENTS

| | | |
|---|---|---|
| 531,792 | 1/1941 | Great Britain. |
| 640,912 | 8/1950 | Great Britain. |
| 996,573 | 6/1965 | Great Britain. |

ROBERT S. WARD, Jr., Primary Examiner

U.S. Cl. X.R.

177—213